US011197558B2

(12) United States Patent
Tominaga et al.

(10) Patent No.: US 11,197,558 B2
(45) Date of Patent: Dec. 14, 2021

(54) MANIFOLD FOR BODY SUPPORT APPARATUS, AND BODY SUPPORT APPARATUS

(71) Applicant: PARAMOUNT BED CO., LTD., Tokyo (JP)

(72) Inventors: Yusuke Tominaga, Tokyo (JP); Makoto Tanaka, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 25 days.

(21) Appl. No.: 16/643,995

(22) PCT Filed: Dec. 20, 2018

(86) PCT No.: PCT/JP2018/046908
§ 371 (c)(1),
(2) Date: Mar. 3, 2020

(87) PCT Pub. No.: WO2019/198276
PCT Pub. Date: Oct. 17, 2019

(65) Prior Publication Data
US 2021/0059425 A1    Mar. 4, 2021

(30) Foreign Application Priority Data

Apr. 10, 2018  (JP) .............................. JP2018-075451

(51) Int. Cl.
*A47C 27/08*    (2006.01)
*A47C 27/10*    (2006.01)

(52) U.S. Cl.
CPC ............ *A47C 27/082* (2013.01); *A47C 27/10* (2013.01)

(58) Field of Classification Search
CPC ........ A47C 27/082; A47C 27/10; A61G 7/05; A61G 7/05776; A61G 7/05769
See application file for complete search history.

(56) References Cited

U.S. PATENT DOCUMENTS 5,373,595 A * 12/1994 Johnson ............. A61G 7/05769
285/361
2012/0304391 A1* 12/2012 Driscoll, Jr. .......... F04D 29/281
5/710

(Continued)

FOREIGN PATENT DOCUMENTS

| JP | H03121384 A | 5/1991 |
| JP | H0835506 A  | 2/1996 |

(Continued)

OTHER PUBLICATIONS

International Search Report dated Mar. 19, 2019, mailed in counterpart International Application No. PCT/JP2018/046908, 7 pages.

*Primary Examiner* — Nicholas F Polito
*Assistant Examiner* — George Sun
(74) *Attorney, Agent, or Firm* — Kim & Stewart LLP

(57) ABSTRACT

A manifold for a body support apparatus is disposed in a frame together with an air source. This manifold for a body support apparatus includes: a first opening through which air from the air source is supplied; multiple second openings which are connected to openings of the frame; a space which communicates with the first opening; and multiple flow passages which connect the space and the multiple second openings to each other and are designed to open and close. The inside of this manifold for a body support apparatus is sealed.

17 Claims, 10 Drawing Sheets

(56) References Cited

U.S. PATENT DOCUMENTS

| | | | | |
|---|---|---|---|---|
| 2016/0022520 A1* | 1/2016 | Streeter | ............. | A61G 7/05715 |
| | | | | 5/655.3 |
| 2018/0116420 A1* | 5/2018 | Shakal | ................ | A47C 27/082 |
| 2019/0151175 A1* | 5/2019 | Kelch | ................. | A47C 27/082 |

FOREIGN PATENT DOCUMENTS

| | | |
|---|---|---|
| JP | H11125378 A | 5/1999 |
| JP | 2000084011 A | 3/2000 |
| WO | 2016028822 A1 | 2/2016 |

\* cited by examiner (a)

(b)

(c)

MANIFOLD FOR BODY SUPPORT APPARATUS, AND BODY SUPPORT APPARATUS

TECHNICAL FIELD

The present invention relates to a manifold for a body support apparatus, and a body support apparatus.

This application claims priority based on Japanese Patent Application No. 2018-075451 filed in Japan on Apr. 10, 2018, the contents of which are incorporated herein by reference.

BACKGROUND ART

For example, a manifold for a body support apparatus described in PTL 1 below has heretofore been known.

CITATION LIST

Patent Literature

PTL 1: Japanese Patent Application Publication No. 2000-84011

SUMMARY OF INVENTION

Technical Problem

The existing manifold for a body support apparatus described above has room for improvement in simplifying the assembly work.

The present invention has been made in consideration of the above circumstances, and aims to provide a manifold for a body support apparatus that makes it possible to simplify the assembly work.

Solution to Problem

In order to solve the above challenge, the present invention proposes the following means.

An aspect of the present invention is a manifold for a body support apparatus that is disposed in a frame together with an air source, the manifold including: a first opening through which air from the air source is supplied; multiple second openings which are connected to openings of the frame; a space which communicates with the first opening; and multiple flow passages which connect the space and the multiple second openings to each other and are designed to open and close, wherein the inside of the manifold is sealed.

Advantageous Effects of Invention

According to the aspect of the present invention described above, it is possible to simplify the work of assembling a manifold for a body support apparatus.

DESCRIPTION OF EMBODIMENTS

Hereinbelow, an embodiment of a body support apparatus according to the present invention is described with reference to FIGS. 1A to 14 and while exemplifying a case where the body support apparatus is an air mattress apparatus 1.

Figure 1A:
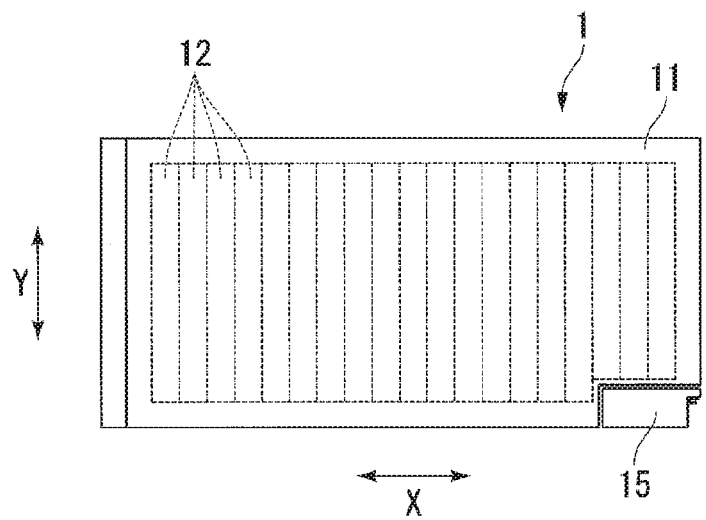
FIG. 1A is a schematic plan view of a body support apparatus equipped with a manifold for a body support apparatus (hereinafter simply referred to as a manifold) according to an embodiment of the present invention.

The air mattress apparatus 1 in this embodiment illustrated in FIG. 1A can be used in medical environment (including nursing-care environment), for example.

In the following description, in a top view, a direction that extends along the body of a user who uses the air mattress apparatus 1 in a supine position is referred to as a first direction X, and a direction that is orthogonal to the first direction X is referred to as a second direction Y. Meanwhile, a direction that is orthogonal to the first direction X and the second direction Y is referred to as a third direction Z (see FIG. 4). The third direction Z is parallel with a vertical direction.

As illustrated in FIG. 1A, the air mattress apparatus 1 includes: a mattress section 11 that has multiple air cells 12 capable of housing the air (fluid) therein; and a unit 15 that is configured to supply the air to the air cells 12 and exhaust the air from the air cells 12.

The mattress section 11 is supported on a known bed apparatus (not illustrated), for example. The bed apparatus may be such an apparatus that, for example, a panel member is divided into multiple sections in the first direction X and the arrangement angle of each of these sections of the panel member is changed to enable a back raising motion and a foot raising (knee raising) motion.

The multiple air cells 12 are each a bar-shaped cell extending in the second direction Y, and are arranged in the first direction X. Note that the shape of the air cells 12 is not limited to a bar shape and may be a lattice shape.

Figure 1B:
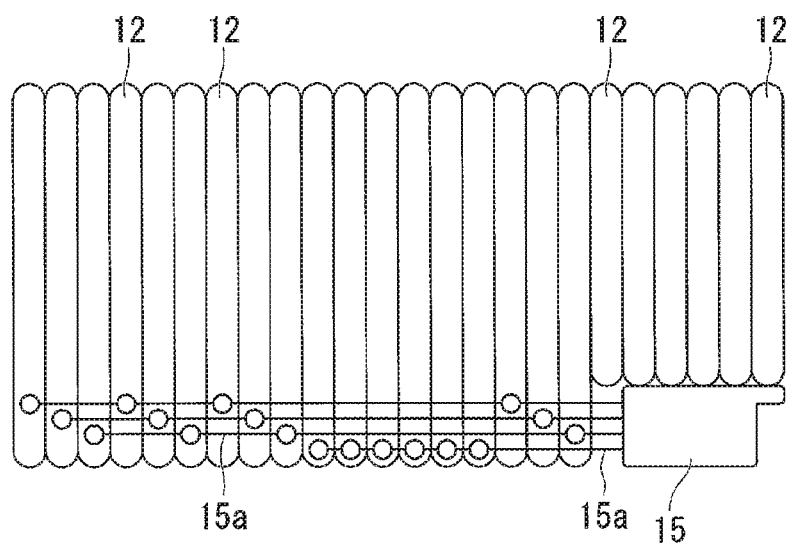
FIG. 1B is a schematic plan view illustrating connection between a mattress section and a unit illustrated in FIG. 1A.

The multiple air cells 12 arranged are sectioned into multiple groups. The air cells 12 are sectioned into three groups and belong to the same flow passage system for every two cells, for example. In this case, the unit 15 supplies the air and exhausts the air to/from each of three flow passage systems individually. Note that the air cells 12 do not necessarily have to be sectioned into three groups and may be sectioned into any two or more groups. FIG. 1B illustrates an example of connection between the mattress section 11 and the unit 15. As illustrated in FIG. 1B, the unit 15 is directly connected to the air cells 12 via multiple tubes 15a. Meanwhile, the unit 15 is indirectly connected to a part of the air cells 12 via another tube (not illustrated) that connects the air cells 12 to each other.

Figure 2A:
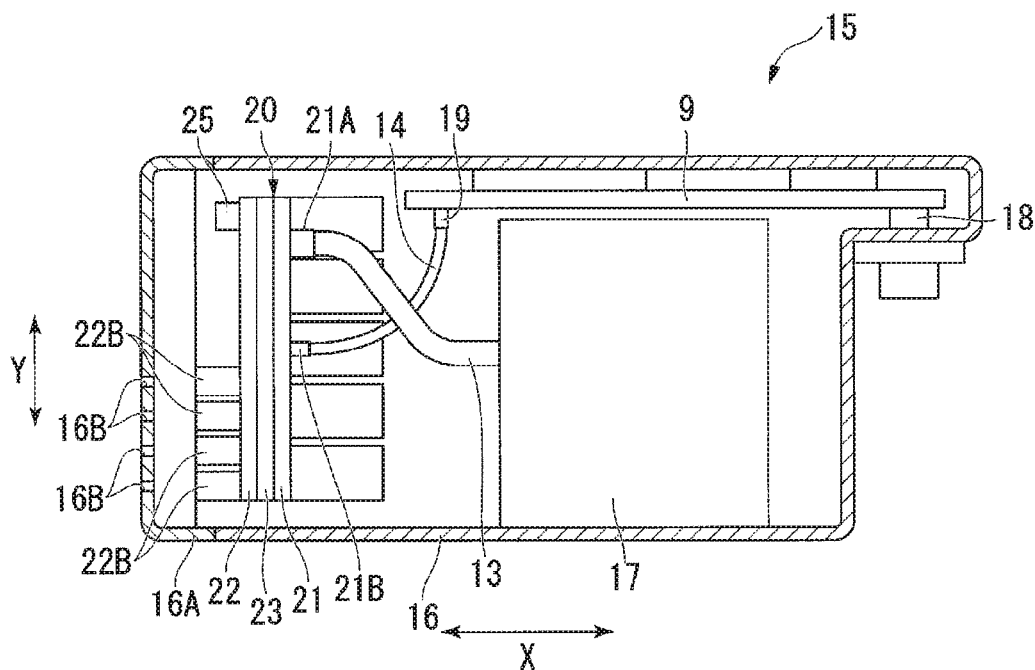
FIG. 2A is a planar cross-sectional view illustrating the inside of the unit illustrated in FIG. 1A.

As illustrated in FIG. 2A, the unit 15 includes: a case (frame) 16 that is substantially rectangular in a plan view; an air source (pump) 17; a connector 18; a pressure sensor 19; and a manifold for a body support apparatus (hereinafter simply referred to as a manifold) 20.

The air source 17, the connector 18, the pressure sensor 19, and the manifold 20 are arranged in the case 16. The connector 18 and the pressure sensor 19 are arranged in the case 16 while being mounted on a substrate 9. Note that the substrate 9 being a controller is configured to control the air source 17 and various valve bodies that are equipped in the unit 15.

A cover 16A is mounted on the case 16. Multiple openings (openings of the frame) 16B are formed in the cover 16A. The manifold 20 is disposed between the cover 16A and the air source 17 in the first direction X.

Tubes (not illustrated) that lead to the air cells 12 are connected to the multiple openings 16B via couplers (not illustrated).

The unit 15 supplies the air to the air cells 12 through the tubes. The multiple (three in this embodiment) tubes are provided so as to correspond to the flow passage systems described above, and the air is supplied to the air cells 12 of the flow passage systems through the tubes.

The air source 17 is disposed away from the cover 16A in the first direction X. In the illustrated example, an air pump is employed as the air source 17. Note that an air blower may be employed as the air source 17 instead, for example.

The pressure sensor 19 is disposed in parallel with the air source 17 in the second direction Y. The pressure sensor 19 is configured to measure the air pressure inside the manifold 20 and the air pressure inside the air cells 12 of each system by measuring the pressure of air flowing downward from a connection port 21B to be described later.

Note that a unit 15A illustrated in FIG. 2B may be employed instead of the unit 15 illustrated in FIG. 2A configuration of the unit 15A will be described later.

Figure 4:
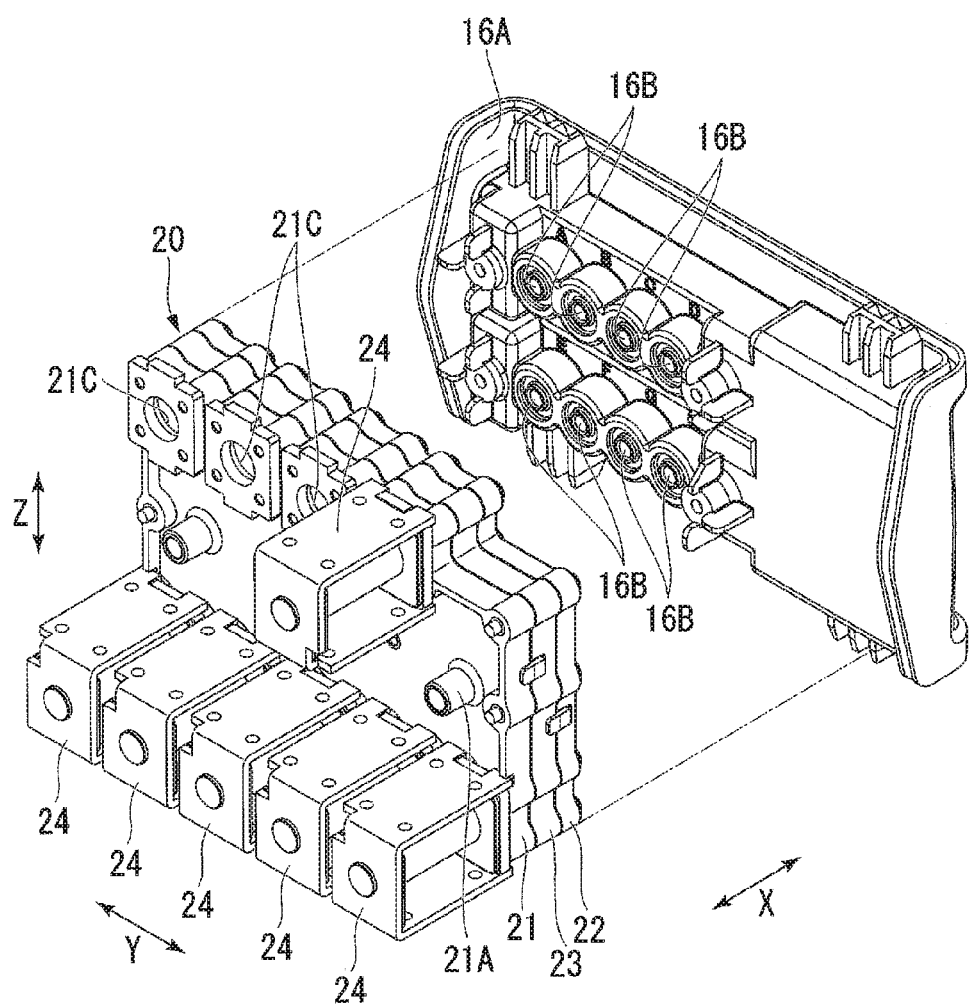
FIG. 4 is an exploded perspective view of a manifold and a cover illustrated in FIG. 2A.

As illustrated in FIG. 4, the manifold 20 is in the shape of a rectangular solid having a rectangular plane such that, in the front view as seen in the first direction X, two sides extend in the third direction Z and the remaining two sides extend in the second direction Y. The size of the manifold 20 in the second direction Y is larger than the side thereof in the third direction 3. Note that the size of the manifold 20 in the third direction Z may be larger than the size thereof in the second direction Y.

Note that, in this embodiment, the state where the manifold 20 is seen in the first direction X is set as the front; however, the present invention is not limited to this. For example, the manifold 20 may be configured in such a way that the state where the manifold is seen in the second direction Y or the third direction Z is set as the front.

The manifold 20 includes multiple platy members 21, 22, 23 that are stacked on each other. In the illustrated example, the manifold 20 is constituted of the three platy members 21, 22, 23 the front and back faces of which are oriented in the first direction X.

As illustrated in FIG. 2A and FIG. 4, the multiple platy members 21, 22, 23 include: a first plate 21 that is disposed on the side close to the air source 17 in the first direction N; a second plate 22 that is disposed on the side close to the cover 16A; and an intermediate plate 23 that is disposed between the first plate 21 and the second plate 22.

The first plate 21, the second plate 22, and the intermediate plate 23 have the same size and the same outer shape, and are stacked on each other in the first direction 2.

The first plate 21 is located closer to the air source 17 than the second plate 22 in the first direction X. The second plate 22 is located closer to the cover 16A than the first plate 21 in the first direction X.

(First Plate)

Figure 5:
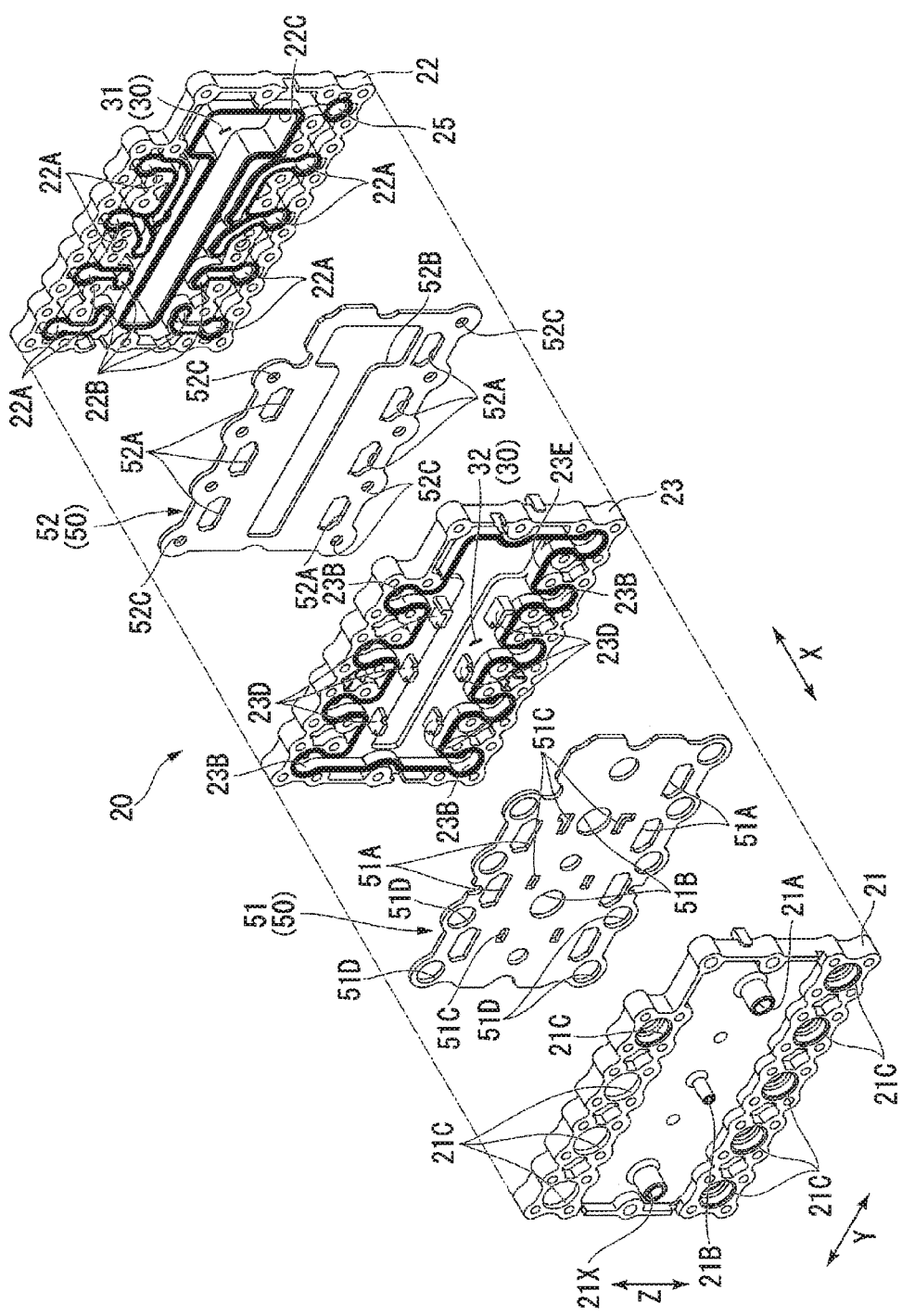
FIG. 5 is an exploded perspective view of the manifold illustrated in FIG. 4.
Figure 6:
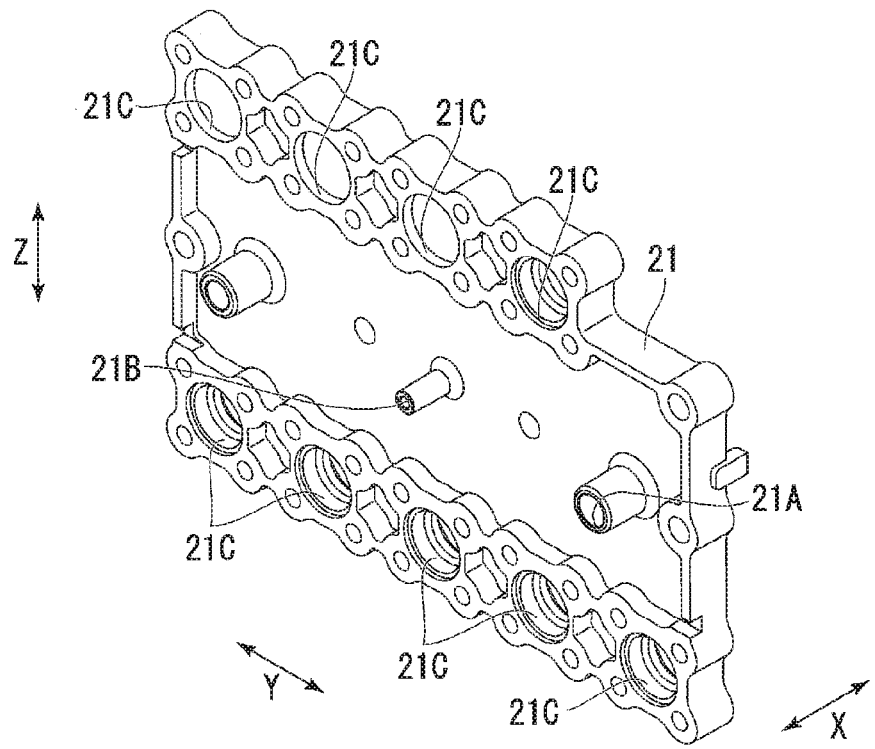
FIG. 6 is a perspective view illustrating a first plate, illustrated in FIG. 5, seen from an air source side.

As illustrated in FIG. 5 and FIG. 6, the manifold 20 includes a first opening 21A through which the air from the air source 17 is supplied.

The first opening 21A is formed in the first plate 21, and is formed of the inside of a tubular body protruding toward the air source 17 in the first direction X. The first opening 21A is disposed in one end part of the first plate 21 in the second direction Y.

As illustrated in FIG. 2A, a tube 13 that is connected to the air source 17 is connected to the first opening 21A. The air from the air source 17 flows downward into the first opening 21A through the tube 13.

As illustrated in FIG. 5 and FIG. 6, the connection port 21B is formed in a central part of the first plate 21 in the second direction Y. As illustrated in FIG. 2A, the connection port 21B is connected to the pressure sensor 19 through a tube 14. The connection port 21B is formed of the inside of a tubular body protruding toward the air source 17 in the first direction X.

In addition, as illustrated in FIG. 5, an exhaust nozzle 21X is formed in the first plate 21. This embodiment shows a mode where the nozzle 21X is sealed and the air is naturally exhausted through another part; however, the present invention is not limited to this aspect. For example, the configuration of FIG. 2B may be employed as another mode. The configuration of FIG. 2B further includes electromagnetic valves 17a, 17b for switching supply and exhaust air.

Figure 2B:
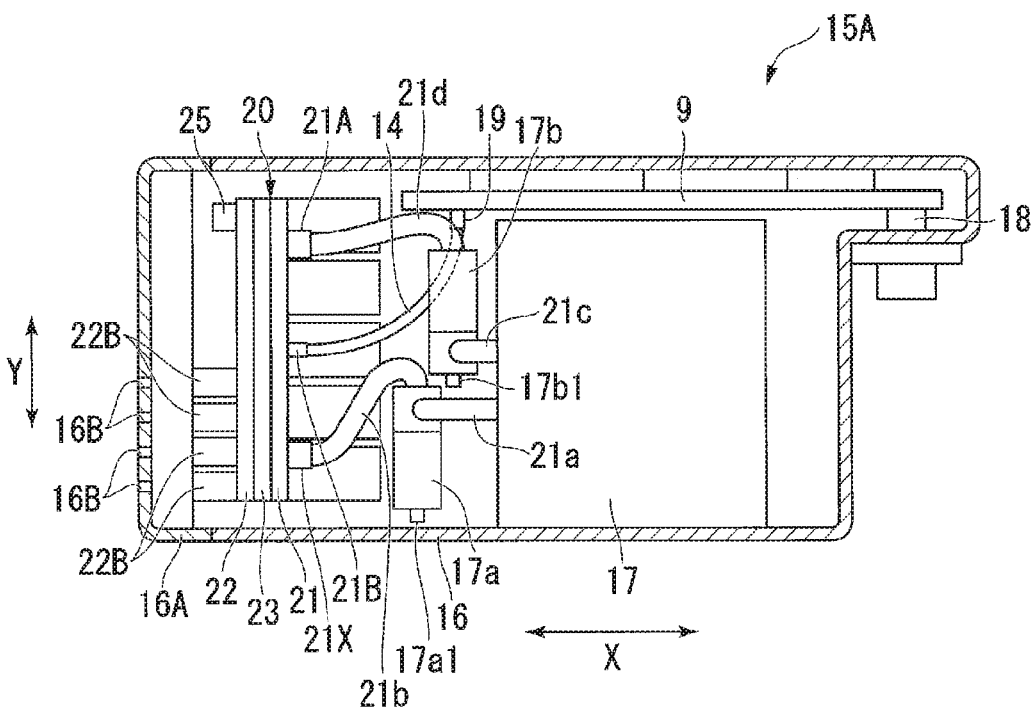
FIG. 2B is a view illustrating a modification example of the unit illustrated in FIG. 1A, and is a planar cross-sectional view illustrating the inside of the unit.
Figure 3:
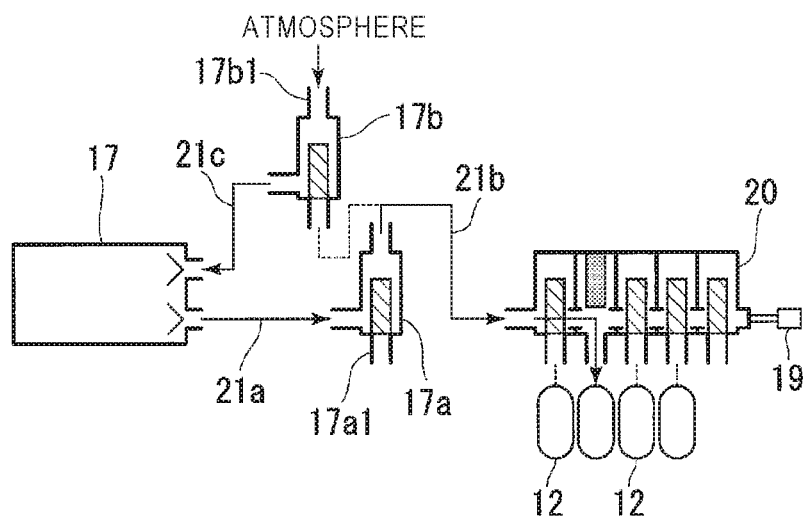
FIG. 3 (a) to (c) of FIG. 3 are views illustrating the operation of the unit in FIG. 2B, in which: (a) illustrates an air supply operation; (b) illustrates a natural air exhaust operation; and (c) illustrates a forced air exhaust operation.
Figure 3:
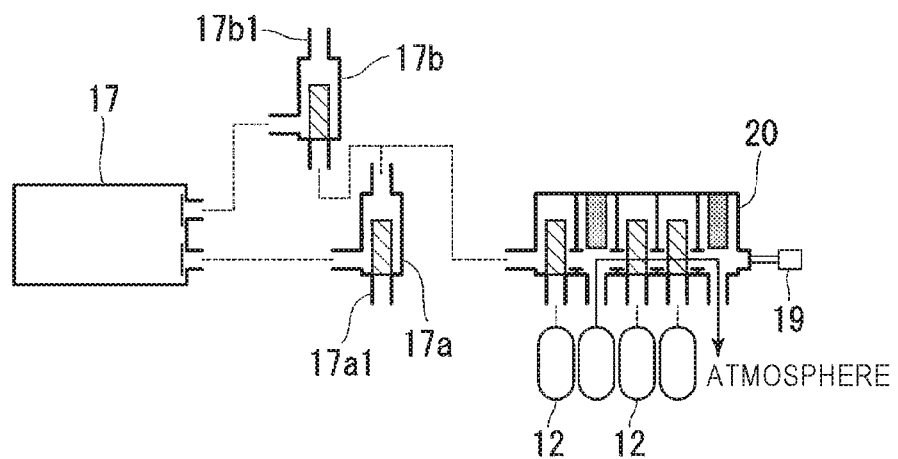
Figure 3:
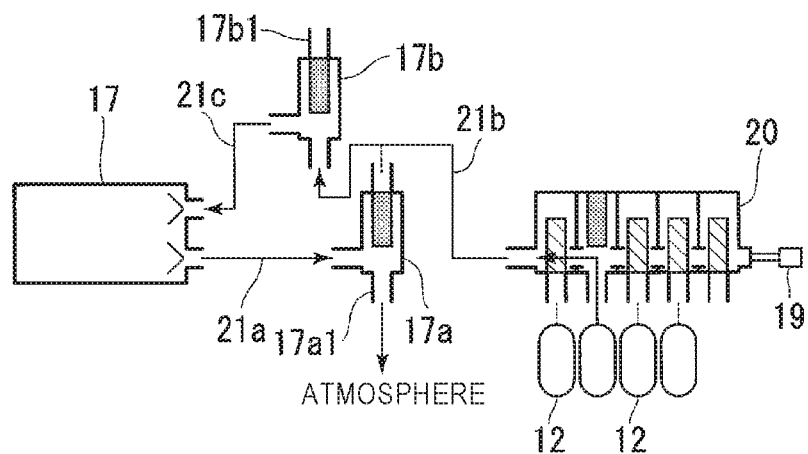

As illustrated in FIGS. 2B and 3, the one electromagnetic valve 17a is connected between the manifold 20 and the air source 17. Specifically, the electromagnetic valve 17a is connected to the air source 17 via a pipe 21a. In addition, the electromagnetic valve 17a is connected to the nozzle 21X of the manifold 20 via a tube 21b. The electromagnetic valve 17a is provided with a discharge port 17a1 for releasing the atmosphere through which the inside and outside of the valve communicate with each other. Note that, although this embodiment shows a mode where the electromagnetic valve 17a and the electromagnetic valve 17b are separated from the manifold 20, the present invention is not limited to this aspect and the electromagnetic valve 17a and the electromagnetic valve 17b may be integrated with the manifold 20.

As illustrated in FIGS. 2B and 2, the other electromagnetic valve 17b is also connected between the manifold 20 and the air source 17. Specifically, the electromagnetic valve 17b is connected to the air source 17 via a pipe 21c. In addition, the electromagnetic valve 17b is connected to the first opening 21A of the manifold 20 via a tube 21d. The electromagnetic valve 17b is provided with an intake port 17*b*1 for taking in the air through which the inside and outside of the valve communicate with each other.

Note that, in FIG. 3, the tubes 21*b*, 21*d* partially overlap each other for the purpose of explaining the operation; however, the actual connection relationship is as illustrated in FIG. 2B and these tubes 21*b*, 21*d* do not actually communicate with each other.

An air supply operation, a natural air exhaust operation, and a forced air exhaust operation are described using FIG. 3.

First, in the air supply operation illustrated in (a) of FIG. 3, the air is drawn in from the atmosphere by the air source 17, and the air thus drawn is supplied to the air cells 12 via the manifold 20. Specifically, the air source 17 is activated with the intake port 17*b*1 of the electromagnetic valve 17*b* opened and the discharge port 17*a*1 of the electromagnetic valve 17*a* closed. Thereby, the air (atmosphere) is taken in through the electromagnetic valve 17*b*, and passes through the pipe 21*c*, the air source 17, the pipe 21*a*, the electromagnetic valve 17*a*, and the tube 21*b* in this order to be supplied to the nozzle 21X of the manifold 20.

Meanwhile, in the natural air exhaust operation illustrated in (b) of FIG. 3, the air is released to the atmosphere from the air cells 12. Specifically, the air from the air cells 12 is released to the atmosphere through the manifold 20 with the air source 17 stopped to stop air supply to and air exhaust from the manifold 20.

Meanwhile, in the forced air exhaust operation illustrated in (c) of FIG. 3, the air source 17 sucks the air from the air cells 12 and exhausts it to the atmosphere. Specifically, the air source 17 is activated with the intake port 17*b*1 of the electromagnetic valve 17*b* closed and the discharge port 17*a*1 of the electromagnetic valve 17*a* opened. Thereby, the air inside the air cells 12 is sucked out through the manifold 20, the tube 21*d*, the electromagnetic valve 17*b*, the pipe 21*c*, the air source 17, the pipe 21*a*, and the electromagnetic valve 17*a* in this order to be exhausted into the atmosphere through the discharge port 17*a*1.

As illustrated in FIG. 4, multiple valves 24 are mounted on the first plate 21. As illustrated in FIG. 5, multiple mounting ports (mounting parts) 21C on which to mount the valves 24 are formed in an upper end edge and a lower end edge of the first plate 21. Each mounting port 21C penetrates the first plate 21 in the first direction X.

In the illustrated example, four mounting ports 21C are arranged in the upper end edge of the first plate 21 whereas five mounting ports 21C are arranged in the lower end edge thereof.

The multiple mounting ports 21C arranged in each of the upper end edge and the lower end edge of the first plate 21 are arranged in line in the second direction Y.

Each valve 24 is an electromagnetic valve having an electromagnet (solenoid) and a plunger. The valve 24 can move the plunger using the magnetic force of the electromagnet.

In the illustrated example, the valves 24 are arranged respectively in one of the multiple mounting ports 21C arranged in the upper end edge and the five mounting ports 21C arranged in the lower end edge.

Figure 7:
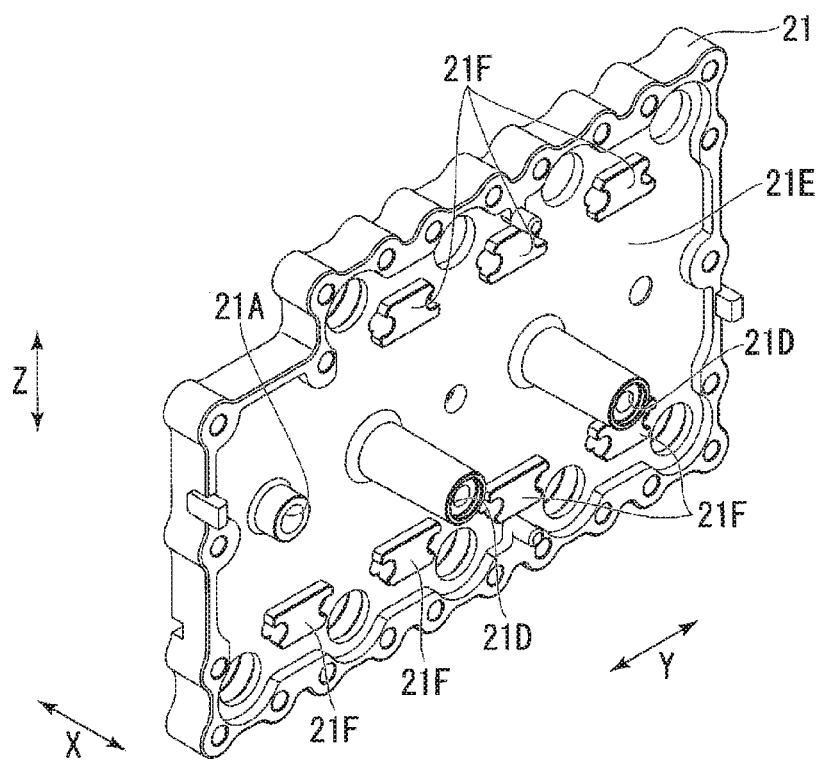
FIG. 7 is a perspective view illustrating the first plate, illustrated in FIG. 5, seen from a cover side.

As illustrated in FIG. 7, tubular parts 21D that protrude inward are formed on an inner face of the first plate 21 facing the inside of the manifold 20.

Two tubular parts 21D are arranged with a space between them in the second direction Y. A female screw part is formed in an inner circumferential face of each tubular part 21D. A screw (not illustrated) for fastening the multiple platy members are mounted in the female screw part.

In a state where the multiple platy members 21, 22, 23 are stacked on each other, the tubular parts 21D are in contact with an inner face of the second plate 22 facing the inside of the manifold 20.

(Second Plate)

Figure 10:
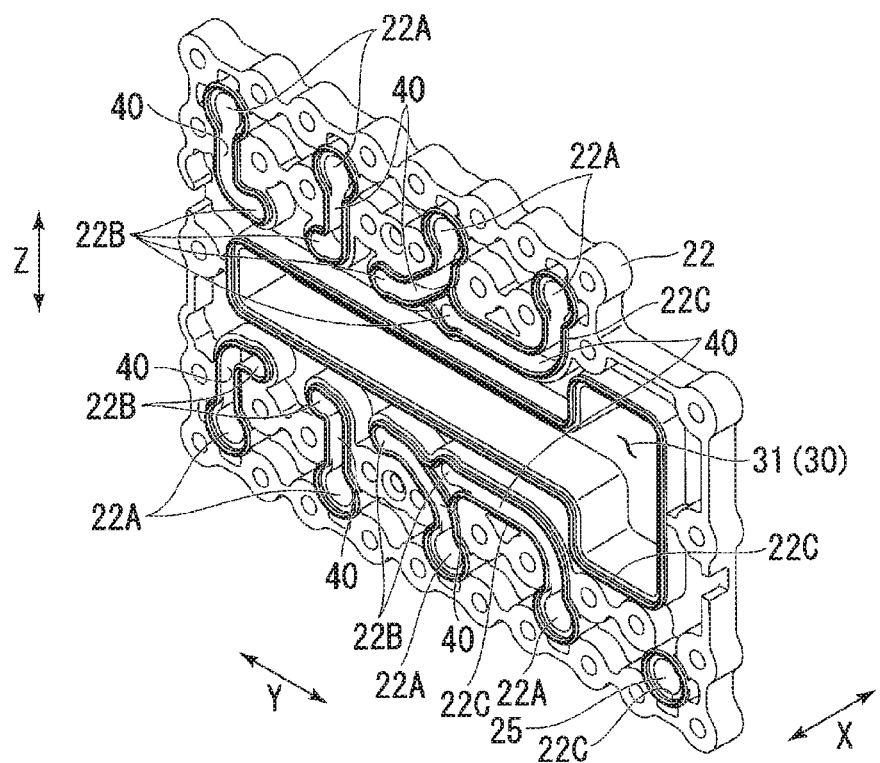
FIG. 10 is a perspective view illustrating a second plate, illustrated in FIG. 5, seen from the air source side.

As illustrated in FIG. 5 and FIG. 10, in portions of the second plate 22 that overlap with the mounting ports 21C of the first plate 21 in the front view when the second plate 22 is stacked on the first plate 21, first holes 22A are formed respectively so as to communicate with the mounting ports 21C.

The multiple first holes 22A are arranged in line in the second direction Y in an upper end edge and a lower end edge of the second plate 22. Each first hole 22A is circular in the front view.

The multiple first holes 22A have the same shape and the same size. Each first hole 22A is bottomed and closed.

Figure 11:
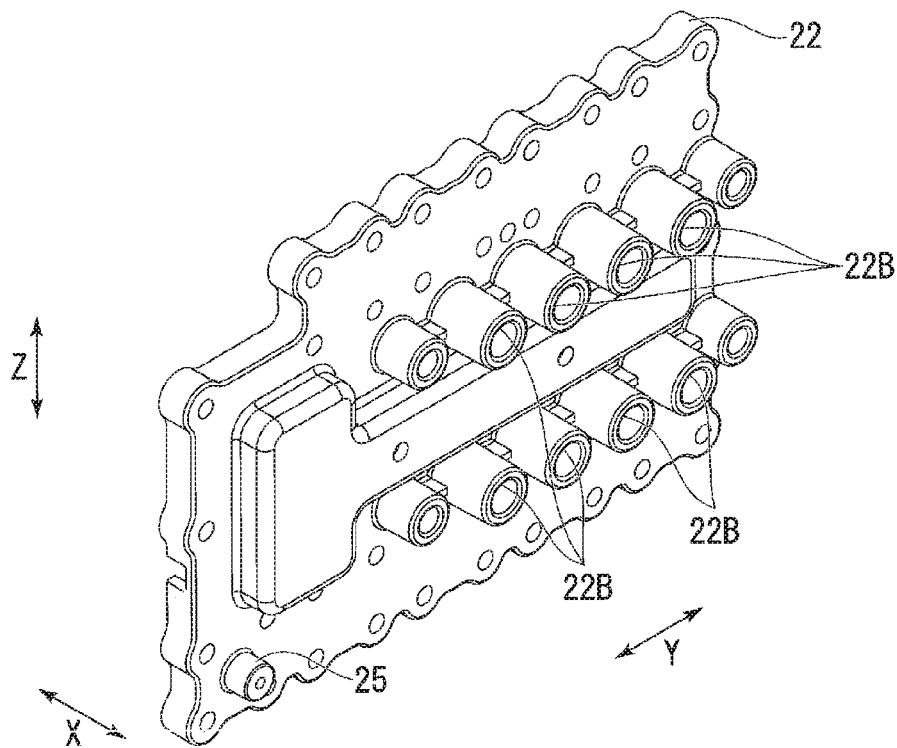
FIG. 11 is a perspective view illustrating the second plate, illustrated in FIG. 5, seen from the cover side.

As illustrated in FIG. 2 and FIG. 11, the manifold 20 also includes: second openings 22B that are connected to the openings 16B of the case 16; and an exhaust port 25 that is designed to exhaust the air inside the manifold 20 to the outside. The multiple second openings 22B are formed in the second plate 22. The first opening 21A and the second openings 22B communicate with each other through the inside of the manifold 20.

The single exhaust port 25 is formed in the second plate.

Each second opening 22B is formed of the inside of a tubular body protruding toward the outside of the manifold 20. In the illustrated example, the second openings 22B, eight in total, are arranged in two lines so that the second openings of each line are arranged in line in the second direction Y and the lines are spaced from each other in the third direction Z. The multiple second openings 22B are connected respectively to the openings 16B of the case 16.

As illustrated in FIG. 10, the manifold 20 also includes multiple flow passages 40 that connect a space 30 to be described later and the second openings 22B to each other and are designed to open and close. As illustrated in FIG. 10, the multiple flow passages 40 are formed in the second plate 22.

The multiple flow passages 40 connect respective sets of the first holes 22A and the second openings 22B. The flow passages 40 each include a portion extending in the third direction Z and a portion extending in the second direction Y in the front view.

As described above, the multiple flow passages 40 connect the space 30 and the respective multiple second openings 22B. In addition, as will be described later, opening and closing of the multiple flow passages 40 are controlled respectively.

(Intermediate Plate)

Figure 8:
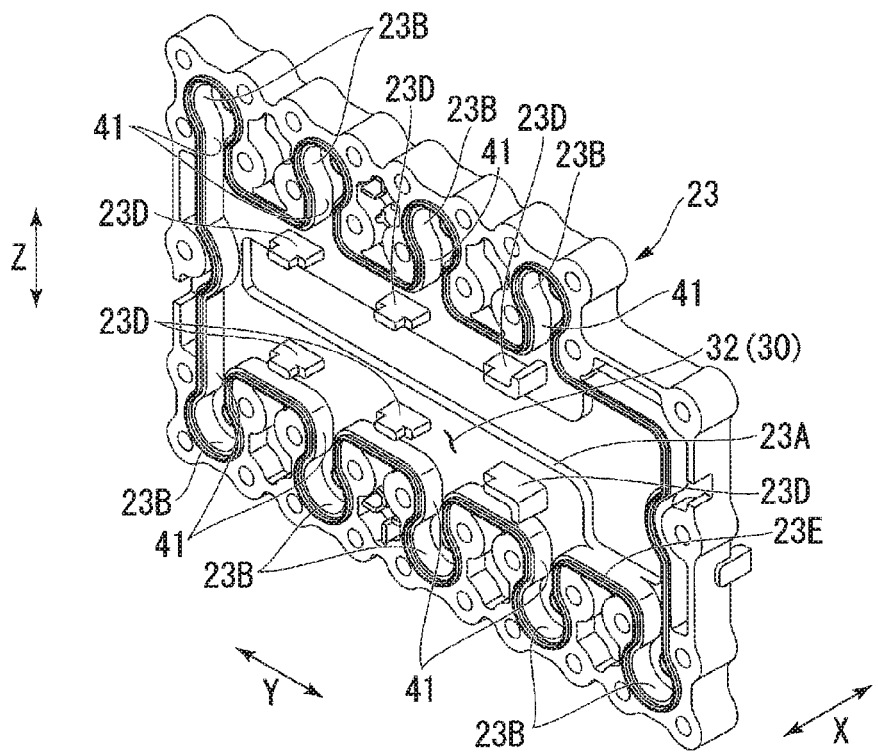
FIG. 8 is a perspective view illustrating an intermediate plate, illustrated in FIG. 5, seen from the air source side.

As illustrated in FIG. 5 and FIG. 8, in portions of the intermediate plate 23 that overlap with the mounting ports 21C of the first plate 21 in the front view when the intermediate plate 23 is stacked on the first plate 21, second holes 23B are formed respectively so as to communicate with the mounting ports 21C.

The multiple second holes 23B are arranged in line in the second direction Y in an upper end edge and a lower end edge of the second plate 22.

Each second hole 23B is circular in the front view. The multiple second holes 23B have the same shape and the same size. Each second hole 23B is bottomed.

Intermediate passages 41 are formed between the respective second holes 23B and a second space 32 to be described later. The second holes 23B are located outside the second space 32 in the third direction Z.

The intermediate passages 41 connect the second holes 23B and the second space 32 to be described later in the third direction Z. The bottom parts of the respective second space 32, intermediate passages 41, and second holes 23B extend continuously without any steps between them in the third direction Z.

Figure 9:
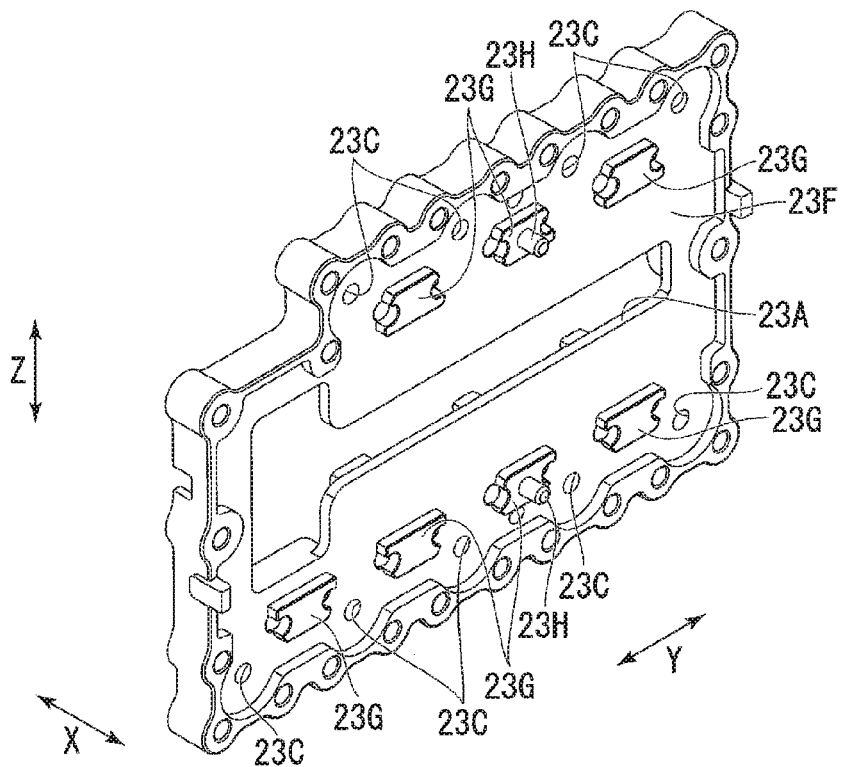
FIG. 9 is a perspective view illustrating the intermediate plate, illustrated in FIG. 5, seen from the cover side.

As illustrated in FIG. 9, third openings 23C that are designed to open and close the flow passages 40 are formed in the intermediate plate 23. The plungers of the valves 24 come into contact with or are separated from the intermediate plate 23 to open and close the third openings 23C.

The third openings 23C are formed in the bottom parts of the second holes 23B and penetrate the bottom parts of the second holes 23B in the first direction X. The third openings 23C have a smaller diameter than the second holes 23B and are arranged coaxially with the second holes 23B.

As illustrated in FIG. 8, multiple first convex parts 23D that protrude toward the first plate 21 and come into contact with the first plate 21 are formed on the intermediate plate 23. In the illustrated example, the first convex parts 23D are arranged in two lines so that the first convex parts of each line are spaced from each other in the second direction Y and the lines are spaced from each other in the third direction Z.

The first convex parts 23D pass through third throughholes 51C of a first gasket 51 to be described later and come into contact with the inner face of the first plate 21. Each third through-hole 51C has the same shape as the first convex part 23D.

As illustrated in FIG. 9, multiple second protrusions 23G that protrude toward the second plate 22 are formed on a first face of the intermediate plate 23 facing toward the second plate 22. The multiple second protrusions 23G are arranged in two lines so that the second protrusions of each line are arranged in line in the second direction Y and the lines are spaced from each other in the third direction Z.

Second convex parts 23H that protrude toward the second plate 22 and come into contact with the second plate 22 are also formed on the intermediate plate 23. In the illustrated example, two second convex parts 23H are spaced from each other in the third direction Z.

Each of the second convex parts 23H is formed on a face of the second protrusion 23G facing toward the second plate 22.

(Space)

As illustrated in FIG. 5, FIG. 8, and FIG. 10, the manifold 20 also includes the space 30 that communicates with the first opening 21A. The space 30 is formed between the first plate 21 and the second plate 22.

The space 30 is constituted of: a first space 31 that is formed in the second plate 22; and the second space 32 that is formed in the intermediate plate 23. The first space 31 and the second space 32 communicate with each other.

As illustrated in FIG. 10, the first space 31 is in the shape of a rectangle having two sides extending in the third direction Z and the remaining two sides extending in the second direction Y in the front view. The dimension of the first space 31 in the second direction Y is larger than the dimension thereof in the third direction Z.

In the front view, as to one end part of the first space 31 in the second direction Y, its dimension in the third direction Z is larger than the dimension of the other portion.

As illustrated in FIG. 8, the second space 32 has two sides extending in the third direction Z and the remaining two sides extending in the second direction Y in the front view. The dimension of the second space 32 in the second direction Y is larger than the dimension thereof in the third direction Z.

The dimensions of the second space 32 in the third direction Z and in the second direction Y are larger than the dimensions of the first space 31 in the third direction Z and in the second direction Y.

A first window 23A that penetrates the intermediate plate 23 in the first direction X is formed in the intermediate plate 23. The first window 23A has the same shape and the same size as the first space 31 in the second plate 22.

In the intermediate plate 23, the first window 23A is located at the same position as the first space 31 of the second plate 22 when the intermediate plate 23 is stacked on the second plate 22. The rest space 31 and the second space 32 communicate with each other through the first window 23A.

(Gasket)

As illustrated in FIG. 5, between the first plate 21 and the intermediate plate 23 and between the intermediate plate 23 and the second plate 22, gaskets 50 that are designed to seal the inside between these plates are arranged respectively.

The gaskets 50 include: the first gasket 51 that is disposed between the first plate 21 and the intermediate plate 23; and a second gasket 52 that is disposed between the intermediate plate 23 and the second plate 22. The first gasket 51 and the second gasket 52 are formed of a rubber material.

(First Gasket)

The first gasket 51 has the same shape as the first plate 21 and is formed smaller in size than the first plate 21.

As illustrated in FIG. 7, a first concave part 21E in which to place the first gasket 51 is formed in the inner face of the first plate 21. The first concave part 21E is formed across the inside of an outer edge of the first plate 21.

Multiple first protrusions 21F that protrude toward the inside are formed in the inner face of the first plate 21. The multiple first protrusions 21F are arranged in two lines so that the first protrusions of each line are arranged in line in the second direction Y and the lines are spaced from each other in the third direction Z.

As illustrated in FIG. 5, multiple first through-holes 51A that are designed to engage with the first protrusions 21F are formed in the first gasket 51. The engagement between the first protrusions 21F and the first through-holes 51A makes it possible to prevent the first gasket 51 from being misaligned in the first concave part 21E.

In addition, in the first gasket 51, second through-holes 51B that are designed to engage with the tubular parts 21D and the third through-holes 51C that are designed to engage with the first convex parts 23D to be described later are formed.

Further, in the first gasket 51, fourth through-holes 51D through which the mounting ports 21C and the second holes 23B communicate with each other are formed, in the first gasket 51, the fourth through-holes 51D are formed at portions located between the respective sets of the mounting ports 21C and the second holes 23B.

The plungers of the valves 24 mounted on the mounting ports 21C pass through the fourth through-holes 51D, whereby the plungers can come into contact with the bottom parts of the second holes 23B of the intermediate plate 23 at portions corresponding to opening circumferential edge parts of the third openings 23C.

(Second Gasket)

As illustrated in FIG. 5, the second gasket 52 has the same shape as the second plate 22 and is formed smaller in size than the second plate 22.

As illustrated in FIG. 9, a second concave part 23F in which to place the second gasket 52 is formed in the first face of the intermediate plate 23 facing toward the second plate 22. The second concave part 23F is formed across the intermediate plate 23.

As illustrated in FIG. 5, multiple fifth through-holes 52A that are designed to engage with the second protrusions 23G are formed in the second gasket 52. The engagement between the second protrusions 23G and the fifth through-holes 52A makes it possible to prevent the second gasket 52 from being misaligned in the second concave part 23F.

In addition, a second window 52B having the same shape as the first window 23A of the intermediate plate 23 is formed in the second gasket 52.

Further, sixth through-holes 52C through which the third openings 23C and the first holes 22A communicate with each other are formed in the second gasket 52. The air coming through the third openings 23C flows through the sixth through-holes 52C toward the first holes 22A.

Each sixth through-hole 52C is circular and has the same shape as the third opening 23C.

In the second gasket 52, the sixth through-holes 52C are formed at portions located between the respective sets of the third openings 23C and the first holes 22A.

(Rib)

As illustrated in FIG. 8, in the intermediate plate 23, a first rib 23E that protrudes toward the first gasket 51 and is designed to seal the inside of the manifold 20 is formed. The first rib 23E is formed continuously in edge parts of the second space 32, the multiple intermediate passages 41, and the multiple second holes 23B.

Figure 12:
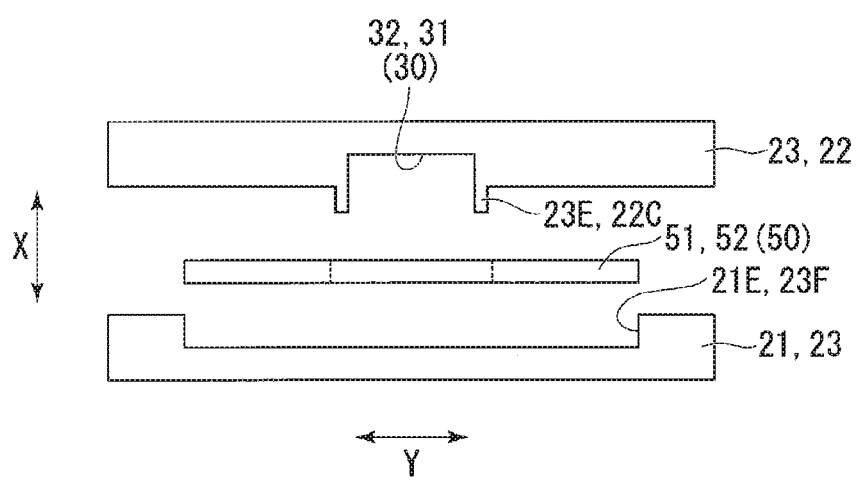
FIG. 12 is a schematic view illustrating a state before the plates of the manifold illustrated in FIG. 5 are stacked on each other.
Figure 13:
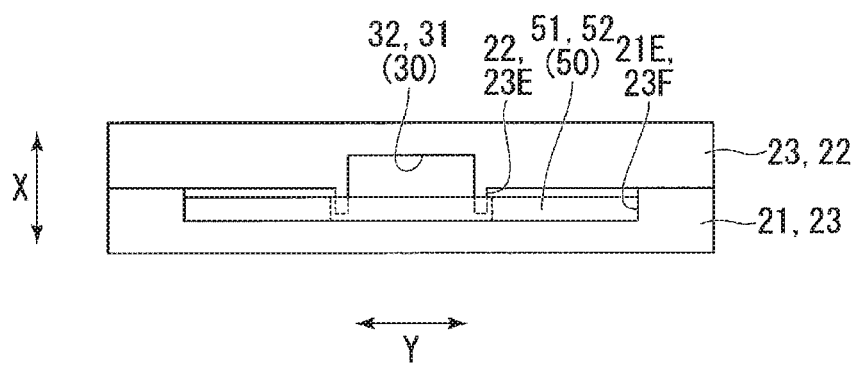
FIG. 13 is a schematic view illustrating a state after the plates of the manifold illustrated in FIG. 5 are stacked on each other.

As illustrated in the schematic views of FIG. 12 and FIG. 13, the first rib 23E comes into contact with the first gasket 51 to ensure airtightness between the first gasket 51 and a portion surrounded by the first rib 23E.

In the second plate 22, a second rib 22C that protrudes toward the second gasket 52 and is designed to seal the inside of the manifold 20 is formed. The second rib 22C is formed continuously in an edge part of the first space 31, an edge part of a portion extending from the first holes 22A to the second openings 22B through the flow passages 40, and an edge part of the exhaust port 25.

As in the case illustrated in the schematic views of FIG. 12 and FIG. 13, the second rib 22C comes into contact with the second gasket 52 to ensure airtightness between the second gasket 52 and a portion surrounded by the second rib 22C.

Figure 14:
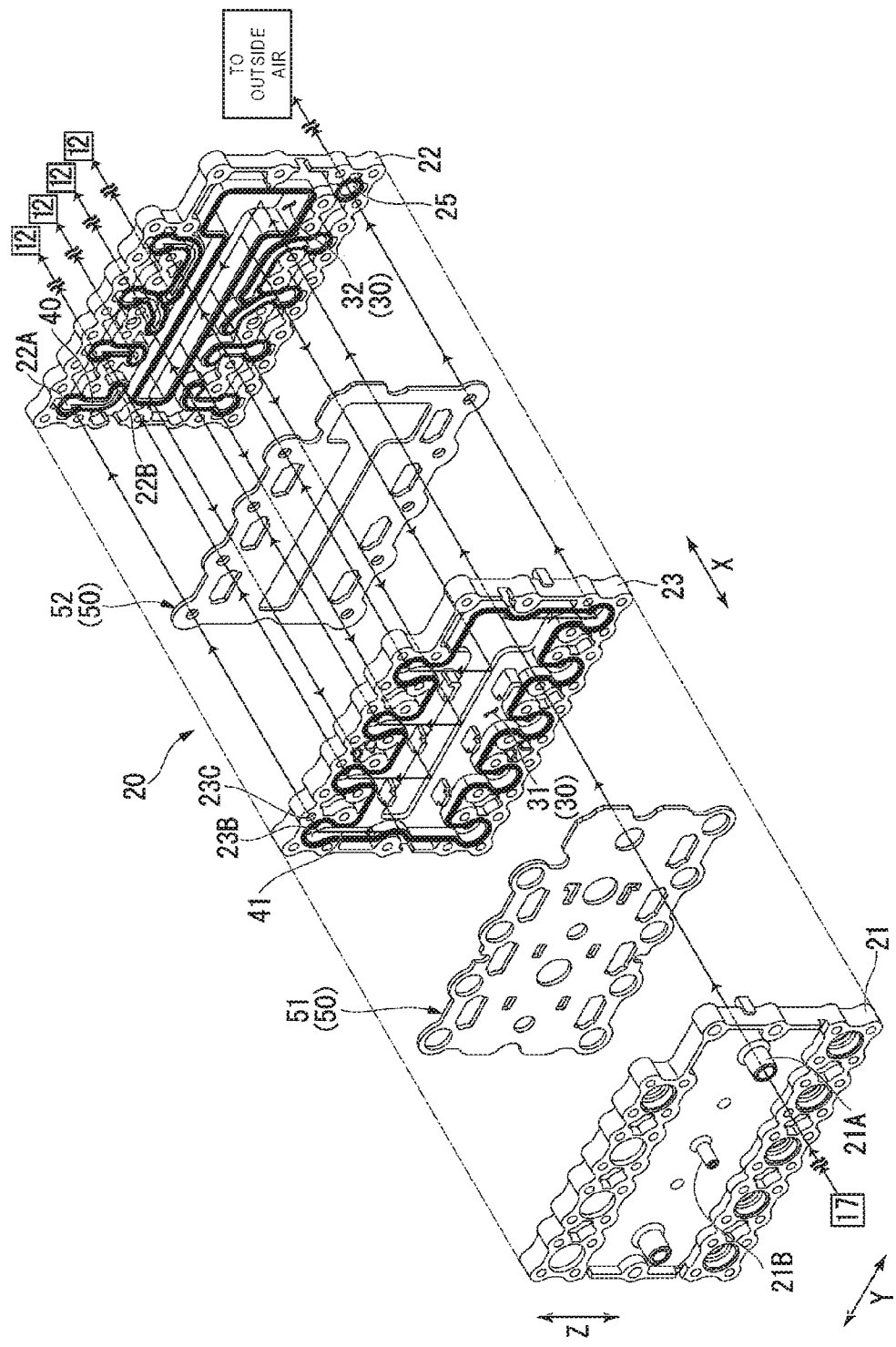
FIG. 14 is an exploded perspective view illustrating the flow of air inside the manifold illustrated in FIG. 5.

Next, the flow of air inside the manifold 20 is described using FIG. 14. Note that, in FIG. 14, the flow of air in a portion located on the lower side in the front view is not illustrated.

As illustrated in FIG. 14, the air supplied from the air source 17 through the first opening 21A enters the space 30. In this event, the air remains in the first space 31 and the second space 32 inside the space 30.

Then, by opening the valves 24, i.e. separating the plungers from the opening circumferential parts of the third openings 23C of the intermediate plate 23 to open the third openings 23C, the air having reached the second holes 23B through the intermediate passages 41 reaches the inside of the first holes 22A through the third openings 23C.

The air having reached the inside of the first holes 22A reaches the second openings 22B through the flow passages 40. Then, the air coming through the second openings 22B is supplied to the air cells 12 through the tubes that are connected to the openings 16B of the unit 15 via the couplers.

In this way, the air supplied into the manifold 20 from the air source 17 can be supplied to any desired air cells 12 by opening and closing the multiple valves 24.

In addition, the air inside the air cells 12 can be exhausted through the inside of the manifold 20 by opening the valve 24 corresponding to the exhaust port 25.

As has been described, according to the manifold 20 of this embodiment, the flow passages 40 of the manifold 20 are opened and closed.

Thus, as compared with a configuration in which multiple tubes are mounted on the manifold 20 and the valves 24 are respectively arranged on the tubes so as to be openable and closable, for example, this makes it possible to eliminate the work of mounting the multiple tubes on the manifold 20.

In addition, since no multiple tubes need to be mounted in this manner, it is possible to downsize the configuration of the manifold 20. Accordingly, it is possible to simplify the work of assembling the manifold 20 and downsize the manifold 20. Moreover, since a space is secured around the manifold 20, it is possible to freely connect the manifold to another component.

Additionally, since the manifold 20 is constituted of the multiple platy members, the space 30 inside the manifold 20 can be installed easily by forming a concave in the stacking face of each platy member, and thus the manifold 20 can be molded more easily.

Moreover, since the manifold 20 includes the first plate 21 and the second plate 22, it is possible to form some of the flow passages 40, which are installed inside the manifold 20, in one of these plates and form the others in the other plate. This can make the shape of each of the firsts plate 21 and the second plate 22 less complex.

Besides, since the first gasket 51 and the second gasket 52 are arranged between the first plate 21 and the second plate 22 in addition to the intermediate plate 23, it is possible to reliably seal the inside of the manifold 20.

Further, since the third openings 23C that are designed to open and close the flow passages 40 are formed in the intermediate plate 23, it is possible to form the portions, which are to come into contact with the plungers, in a plate other than the first plate 21 and the second plate 22. Accordingly, as compared with a configuration in which the third openings 23C, for which high airtightness with the plungers as required, are arranged in the first plate 21 or the second plate 22, it is possible to simplify the shape of the first plate 21 or the second plate 22 and lower its required dimensional accuracy.

Thereby, it is possible to achieve good moldability of each plate constituting the manifold 20.

Furthermore, since the body support apparatus (air mattress apparatus 1) includes the manifold 20, the body support apparatus can exhibit the working effects described above.

Note that the technical scope of the present invention is not limited to the above embodiment, and various modifications can be made within a range not deviating from the gist of the present invention.

For example, although the above embodiment shows the configuration in which the body support apparatus is the air mattress apparatus 1, the present invention is not limited to this aspect. The body support apparatus does not necessarily have to be the air mattress apparatus 1.

In addition, although the above embodiment shows the configuration in which the manifold 20 is constituted of the multiple platy members that are stacked on each other, the present invention is not limited to this aspect. The manifold 20 may be formed in one unit by a machining method, such as a 3D printer, with which the space 30 can be formed inside.

Additionally, although the above embodiment shows the configuration in which the intermediate plate 23 is interposed between the first plate 21 and the second plate 22, the present invention is not limited to this aspect. The intermediate plate 23 does not necessarily have to be interposed therebetween.

Moreover, although the above embodiment shows the configuration in which the third openings 23C that are designed to open and close the flow passages 40 are formed in the intermediate plate 23, the present invention is not limited to this aspect. The third openings 23C may be formed in the first plate 21 or the second plate 22 instead.

Further, although the above embodiment shows the configuration in which the first gasket 51 and the second gasket 52 are made of a rubber material and formed separately from the multiple platy members 21, 22, and 23, the present invention is not limited to this aspect. The manifold 20 and the gaskets 50 may be formed integrally by double molding of a resin material and a rubber material, for example.

Furthermore, a string-shaped packing may be employed instead of the platy gaskets 50.

Besides, the constituents in the above embodiment can be replaced with known constituents as needed within a range not deviating from the gist of the present invention, and the modification examples described above may be used in combination as needed.

INDUSTRIAL APPLICABILITY

According to the aspect of the present invention described above, it is possible to simplify the work of assembling a manifold for a body support apparatus. Accordingly, it has a wide industrial applicability.

REFERENCE SIGNS LIST

1: air mattress apparatus, 12: air cell, 16: case (frame), 17: air source, 20: manifold, 21: first plate, 21A: first opening, 21C: mounting port (mounting part), 22: second plate, 22B: second opening, 23: intermediate plate, 23C: third opening, 24: valve, 30: space, 40: flow passage.

The invention claimed is:

1. A manifold for a body support apparatus that is disposed in a frame together with an air source, the manifold comprising:
    a first plate on a first side of the manifold;
    a second plate on a second side of the manifold;
    an intermediate plate between the first and second plates in a first direction;
    a first opening in the first plate through which air from the air source is supplied, the first opening extending through the first plate in the first direction;
    a plurality of second openings in the second plate, the second openings being connected to openings in the frame;
    a space which communicates with the first opening, the space comprising a window region of the intermediate plate and a recessed region of the second plate;
    a plurality of flow passages connecting the space to the plurality of second openings and being designed to be opened and closed by movement of a valve.

2. The manifold according to claim 1, wherein
    each of the plurality of flow passages respectively connect the space to one of the plurality of second openings, and
    opening and closing of each of the plurality of flow passages is respectively controlled by movement of a different valve.

3. The manifold for a body support apparatus according to claim 1, wherein
    a first flat gasket is between the first plate and the intermediate plate, the first flat gasket including a plurality of holes therein.

4. The manifold for a body support apparatus according to claim 2, wherein
    a mounting part of each valve is provided in the first plate, and
    the flow passages are formed in the second plate.

5. The manifold for a body support apparatus according to claim 4, wherein
    a third opening corresponding to each of the flow passages is formed in the intermediate plate, and
    each valve comes into contact with the intermediate plate.

6. A body support apparatus comprising the manifold according to claim 1.

7. The manifold according to claim 1, wherein
    the first plate directly contacts an outer edge of the intermediate plate facing the first side of the manifold, and
    the second plate directly contacts an outer edge of the intermediate plate facing the second side of the manifold.

8. The manifold according to claim 3, wherein the first flat gasket is rubber.

9. The manifold according to claim 8, further comprising:
    a second flat gasket between the intermediate plate and the second plate.

10. The manifold according to claim 9, wherein the second flat gasket is rubber and includes a plurality of holes therein at positions not corresponding to positions of the plurality of holes in the first flat gasket.

11. The manifold according to claim 9, wherein the second flat gasket includes an opening corresponding in position to the window region of the intermediate plate.

12. The manifold according to claim 3, further comprising:
    a second flat gasket between the intermediate plate and the second plate.

13. The manifold according to claim 1, wherein the first, second, and intermediate plates have substantially a same thickness in the first direction and outer shape in a plane orthogonal to the first direction.

14. The manifold according to claim 1, further comprising:
    a plurality of valves on the first side of the manifold, the plurality of valves mounted to the first plate and including portions extending through the first and intermediate plates to open and close the flow passages.

15. The manifold according to claim 1, further comprising:
    a casing on the second side of the manifold, wherein
    the plurality of second openings in the second plate are connect to a plurality of openings in the casing.

16. The manifold according to claim 1, wherein the flow passages are in the second plate.

17. The manifold according to claim 1, wherein the flow passages include portions in both the intermediate plate and the second plate.

* * * * *